(12) United States Patent
Bouchired et al.

(10) Patent No.: US 7,953,367 B2
(45) Date of Patent: May 31, 2011

(54) SYSTEM AND METHOD FOR EFFICIENT FREQUENCY USE IN A HYBRID MULTI-SPOT SATELLITE BROADCASTING SYSTEM

(75) Inventors: Steven Bouchired, Tournefeuille (FR); Christian Combe, Colomiers (FR); Olivier Courseille, Auzeville (FR); Michel-Guy Francon, Toulouse (FR); Christophe Nussli, Toulouse (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 10/503,058

(22) PCT Filed: Feb. 1, 2002

(86) PCT No.: PCT/EP02/01664
§ 371 (c)(1),
(2), (4) Date: Feb. 15, 2005

(87) PCT Pub. No.: WO03/065617
PCT Pub. Date: Aug. 7, 2003

(65) Prior Publication Data
US 2005/0130591 A1    Jun. 16, 2005

(51) Int. Cl.
*H04B 7/14* (2006.01)
*H04B 3/36* (2006.01)
*H04B 7/185* (2006.01)

(52) U.S. Cl. ............... 455/20; 455/447; 455/7; 455/15; 455/16; 455/17; 455/12.1; 455/13.3

(58) Field of Classification Search .............. 455/20, 455/447, 7, 15, 16, 17, 12.1, 13.3
See application file for complete search history.

(56) References Cited

U.S. PATENT DOCUMENTS

| 5,864,579 | A | * | 1/1999 | Briskman | |
|---|---|---|---|---|---|
| 5,930,708 | A | * | 7/1999 | Stewart et al. | 455/428 |
| 5,959,984 | A | * | 9/1999 | Dent | 370/347 |
| 5,963,846 | A | * | 10/1999 | Kurby | 455/13.1 |
| 6,052,586 | A | * | 4/2000 | Karabinis | 455/427 |
| 6,141,534 | A | * | 10/2000 | Snell et al. | 455/12.1 |
| 6,157,811 | A | * | 12/2000 | Dent | 455/12.1 |
| 6,185,265 | B1 | * | 2/2001 | Campanella | 375/341 |
| 6,317,420 | B1 | * | 11/2001 | Schiff | 370/325 |
| 6,510,317 | B1 | * | 1/2003 | Marko et al. | 455/428 |
| 6,628,921 | B1 | * | 9/2003 | Vaddiparty et al. | 455/12.1 |
| 6,711,398 | B1 | * | 3/2004 | Talaie et al. | 455/17 |
| 6,944,139 | B1 | * | 9/2005 | Campanella | 370/315 |
| 6,950,625 | B2 | * | 9/2005 | Regulinski et al. | 455/13.1 |
| 6,975,582 | B1 | * | 12/2005 | Karabinis et al. | 370/204 |
| 6,987,754 | B2 | * | 1/2006 | Shahar et al. | 370/349 |
| 7,181,161 | B2 | * | 2/2007 | Karabinis | 455/12.1 |
| 2002/0187747 | A1 | * | 12/2002 | Sawdey et al. | 455/13.1 |

FOREIGN PATENT DOCUMENTS

| EP | 0 999 661 | A | * | 5/2000 |
| WO | WO 99 49602 | A | * | 9/1999 |
| WO | WO 01 33738 | A | * | 5/2001 |

* cited by examiner

*Primary Examiner* — Wen Huang
(74) *Attorney, Agent, or Firm* — Sughrue Mion, PLLC

(57) ABSTRACT

System and method for use in a hybrid multispot satellite broadcasting system comprising at least one satellite (S; S1; S2) for multibeam broadcasting of beams in respective frequency bandwidths (F1; F2; F3), the system further comprising a plurality of terrestrial repeater (R1; R2; R3) for receiving, processing and re-transmitting said beams in a frequency bandwidth which is different from that of the bandwidth of the beam received. Each terrestrial repeater (R1; R2; R3) re-uses for terrestrial re-transmission a combination of bandwidths corresponding to different beams broadcast from said satellite to different beams.

14 Claims, 4 Drawing Sheets

Necessary Bandwidth

Necessary Bandwidth

SYSTEM AND METHOD FOR EFFICIENT FREQUENCY USE IN A HYBRID MULTI-SPOT SATELLITE BROADCASTING SYSTEM

The present invention relates to a system and a method for efficient frequency use in a hybrid multi-spot satellite broadcasting system. More particularly the present invention relates to a satellite broadcasting system intended for broadcasting multimedia content to mobile end users. The solution proposed by the present invention makes efficient use of the frequency spectrum resources of the system by means of re-utilization of the satellite frequency for terrestrial repetition. The present invention is applicable but not limited to the so-called digital broadcasting by satellite, i.e. DBS, systems.

BACKGROUND OF THE INVENTION

Satellite systems intended for broadcasting towards mobile terrestrial receivers generally operate in the so called L band covering the range of 1 to 2 GHz or in the so called S band which covers the range of 2 to 3 GHz. It turns out that in both these bands, the available bandwidth is limited due to limited frequency spectrum. Moreover these systems usually require the use of terrestrial repeaters in order to overcome effects of degradation and fading in the transmission produced by multipath effects and/or blockage of the line of sight from the satellite. For example in the urban areas where tall buildings exit the blockage effect can become more considerable.

Therefore, use is made of terrestrial repeaters that are usually installed at locations with high visibility towards the satellite. These repeaters are capable of receiving the satellite signal and, after certain internal processing, of re-transmitting the same signal within respective areas of coverage where the users can receive said signal with a desirable quality.

As it is known in the related art, the frequency bands used by said repeaters are different from those used by the satellites and they generally operate within frequency ranges where also spectrum resources are scarce.

In addition, due to the very nature of the multimedia broadcasting, large amounts of programs are usually needed to be transmitted to the users which in turn require relatively large system capacities. This factor is even more considerable in the European systems where multi-lingual multimedia applications are required, thus giving rise to a need for still higher capacities. It is to be noted that requiring larger system capacities in practical terms is to be interpreted as additional need for frequency resources which in the case of usage of terrestrial repeaters could result in the need for at least twice as much of frequency resources as that of a standalone satellite.

However, as it has already been mentioned above that the frequency resources are in practice limited, the direct consequence of a trade off in this respect would thus be the loss of system capacity.

Moreover, the currently existing satellite mobile broadcasting systems are usually single beam satellite systems. The satellite in such a system broadcasts time division multiplexing (TDM) bit streams under quadrature phase shift keyed (QPSK) modulation. The signal is then repeated by the above mentioned repeaters, for example in urban areas, using—for example—an orthogonal frequency division multiplexing (OFDM) waveform in a separate band.

DBS systems frequently make use of time diversity. Time diversity is a feature used so as to enhance terrestrial reception of the satellite signal transmission. According to this feature, use is made of an additional satellite located at a suitably separated position from the first satellite and transmitting substantially the same signal as that of the first one but within a predetermined time delay as compared to the signal transmitted from the first satellite.

In resource usage terms, the direct consequence of using time diversity is that broadcasting one TDM bit stream which would normally fit in one frequency block would require more than three frequency blocks; namely, one frequency block of the first satellite, one further frequency block for the satellite delayed replica and more than one for terrestrial repetition which requires a more robust coding. Therefore, while time diversity helps enhance the reception capacity at the user terminal end, it requires a higher level of usage of the resources.

In order to overcome the above drawbacks in usage of system resources, it is desired to provide a hybrid multispot satellite broadcasting system for providing multimedia programming to mobile users with a relatively high operating capacity while said system is capable of making efficient use of system resources during the terrestrial reception and re-transmission of the downlink signal towards the user.

DESCRIPTION OF THE INVENTION

This goal is achieved by means of the solution provided by the present invention in which a multi-beam architecture is used wherein the frequency bands occupied by the satellite downlink transmissions are re-used during the terrestrial re-transmission according to a criterion that each terrestrial repeater is adapted to use the frequency bands of adjacent downlink beams for a terrestrial re-transmission of the signal received by said repeater.

As it will be discussed further below, the solution provided by the present invention provides substantial increase in the capacity of the satellite broadcasting system. For example, as it will be discussed further below, while the current applications in the L band provide for a programming capacity in the range of 120 multimedia programs, the solution proposed by the present invention can provide a programming capacity of as much as 180 multimedia programs using even less bandwidth.

Accordingly one object of the present invention is that of providing a hybrid multispot satellite broadcasting system comprising at least one satellite capable of multibeam broadcasting of beams in respective frequency bandwidths, each one of said beams adapted to be broadcast towards a terrestrial repeater which is capable of receiving, processing and re-transmitting said beam in a frequency bandwidth which is different from that of the bandwidth of the beam received, characterized in that a bandwidth of a signal re-transmitted from a first terrestrial repeater contains a frequency range substantially equal to a bandwidth used for a beam broadcast from said satellite to at least a second terrestrial repeater.

According to an aspect of the present invention, said frequency range within the bandwidth of said retransmitted signal contains at least two bandwidths, one being different from the other, said bandwidths being substantially equal to bandwidths used for respective beams broadcast from said satellite to respective second and third terrestrial repeaters.

According to another aspect of the present invention, said satellite broadcasts at least a first, a second and a third beam, each beam directed to a respective first, second and third terrestrial repeater, wherein, said first terrestrial repeater re-transmits said first beam using a bandwidth which is a combination of the respective bandwidths of said second and said third beams.

Another object of the present invention is that of providing a method for a hybrid multispot broadcasting through a satellite system, said system comprising at least one satellite for multibeam broadcasting of beams in respective frequency bandwidths, each one of said beams being broadcast towards a terrestrial repeater which is capable of receiving, processing and re-transmitting said beam in a frequency bandwidth which is different from that of the bandwidth of the beam received, characterized in that said first terrestrial repeater re-transmits said signal in a bandwidth containing a frequency range substantially equal to a bandwidth used for a beam broadcast from said satellite to at least a second terrestrial repeater.

These and further features of the present invention as well as advantages thereof are explained in more detail in the following description as well as in the claims with the aid of the accompanying drawings.

BRIEF DESCRIPTION OF THE DRAWINGS

FIG. 1b shows the various bandwidths required for terrestrial repetition of a beam broadcast according to the satellite system of FIG. 1a.

EXAMPLES OF PREFERRED EMBODIMENTS

Figure 1A:
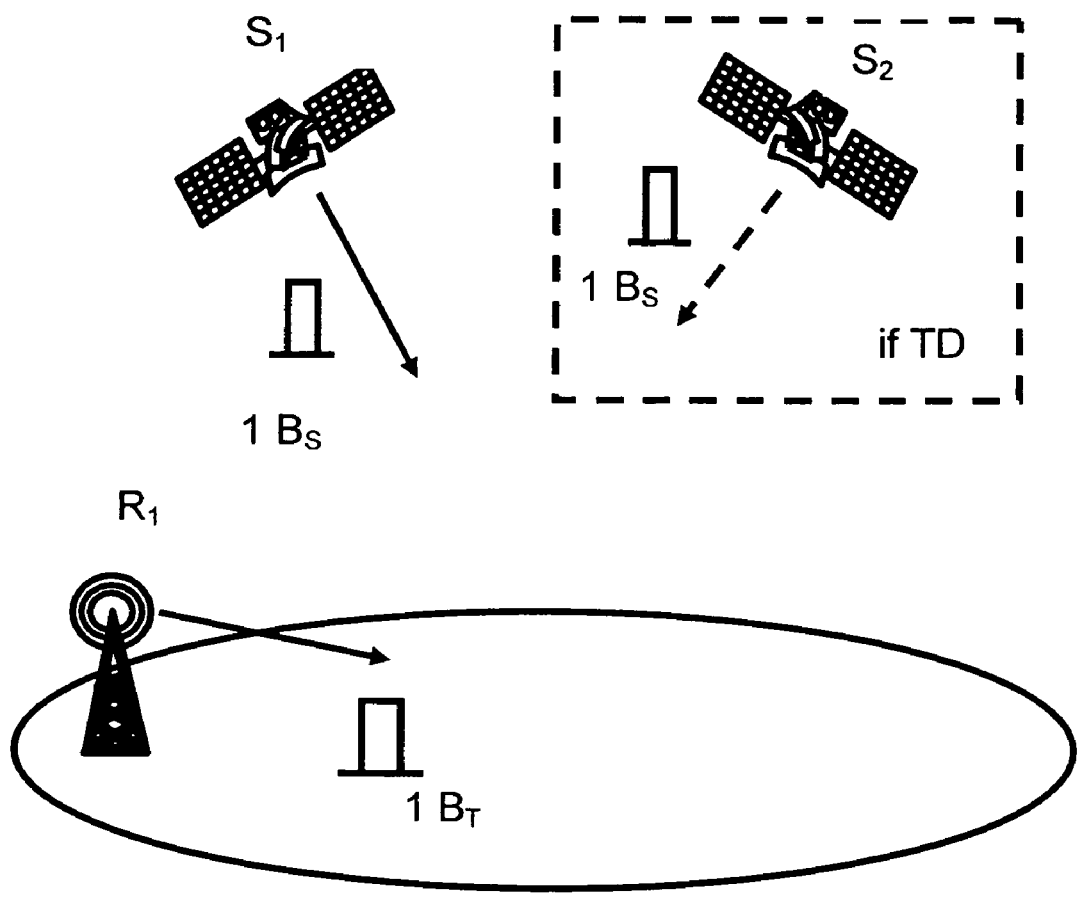
FIG. 1a is a schematic representation of a satellite system broadcasting in single beam arrangement according the traditional techniques.

In the scheme shown in FIG. 1a, a traditional satellite system is shown which broadcasts in single beam configuration. In such systems, the satellite S1 broadcasts towards a terrestrial repeater R1 which is capable of receiving, processing and re-transmitting a beam broadcast from the satellite S1.

Although the description of an embodiment that follows is given using an example of a transmission in TDM mode, it is to be noted that the invention is also applicable to other modes of transmission, in particular in code division multiplexing, i.e. CDM.

It is assumed that the bandwidth occupied for each beam broadcast in downlink transmission from the satellite to be $B_S$. As the corresponding terrestrial re-transmission by the repeater R1 requires a larger coding rate, the bandwidth used by said terrestrial repeater R1 to transmit the same information is assumed to be $B_T = k \times B_S$; where $1 \leq k \leq 2$ in case TDM mode is used. In case of using CDM mode, k=1.

Figure 1B:
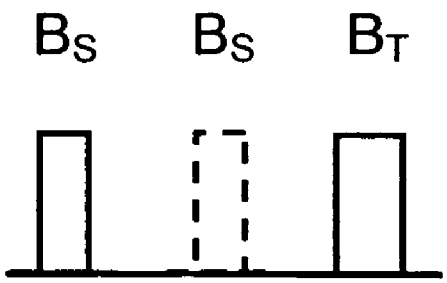

As shown in FIG. 1b, the total frequency bandwidth required for the reception of the downlink beam and perform re-transmission of the same, in the traditional systems, would involve one bandwidth $B_S$ for the downlink and one $B_T$ for the re-transmission, Therefore the total bandwidth required would be $B_S + B_T$.

As discussed further above, in order to obtain higher reception quality in the satellite transmission, use may be made of time diversity which involves the use of an additional satellite S2. In such case the second satellite S2 broadcasts a further overlapping beam thus occupying an additional bandwidth $B_S$ which in turn increases the total bandwidth used for one single transmission to as much as $2B_S + B_T$.

Figure 2B:
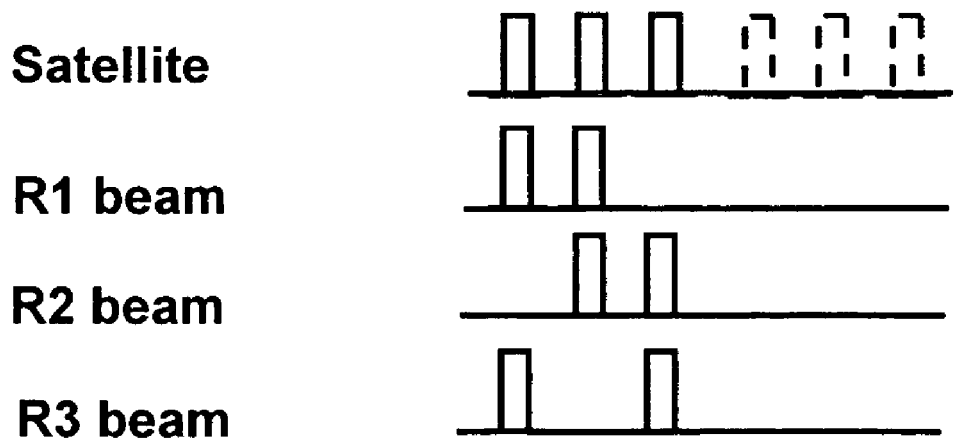
FIG. 2b shows the various bandwidths required for terrestrial repetition of beams broadcast according to the satellite system of FIG. 2a wherein the concept of re-usage of the frequency bandwidths is represented.
Figure 2A:
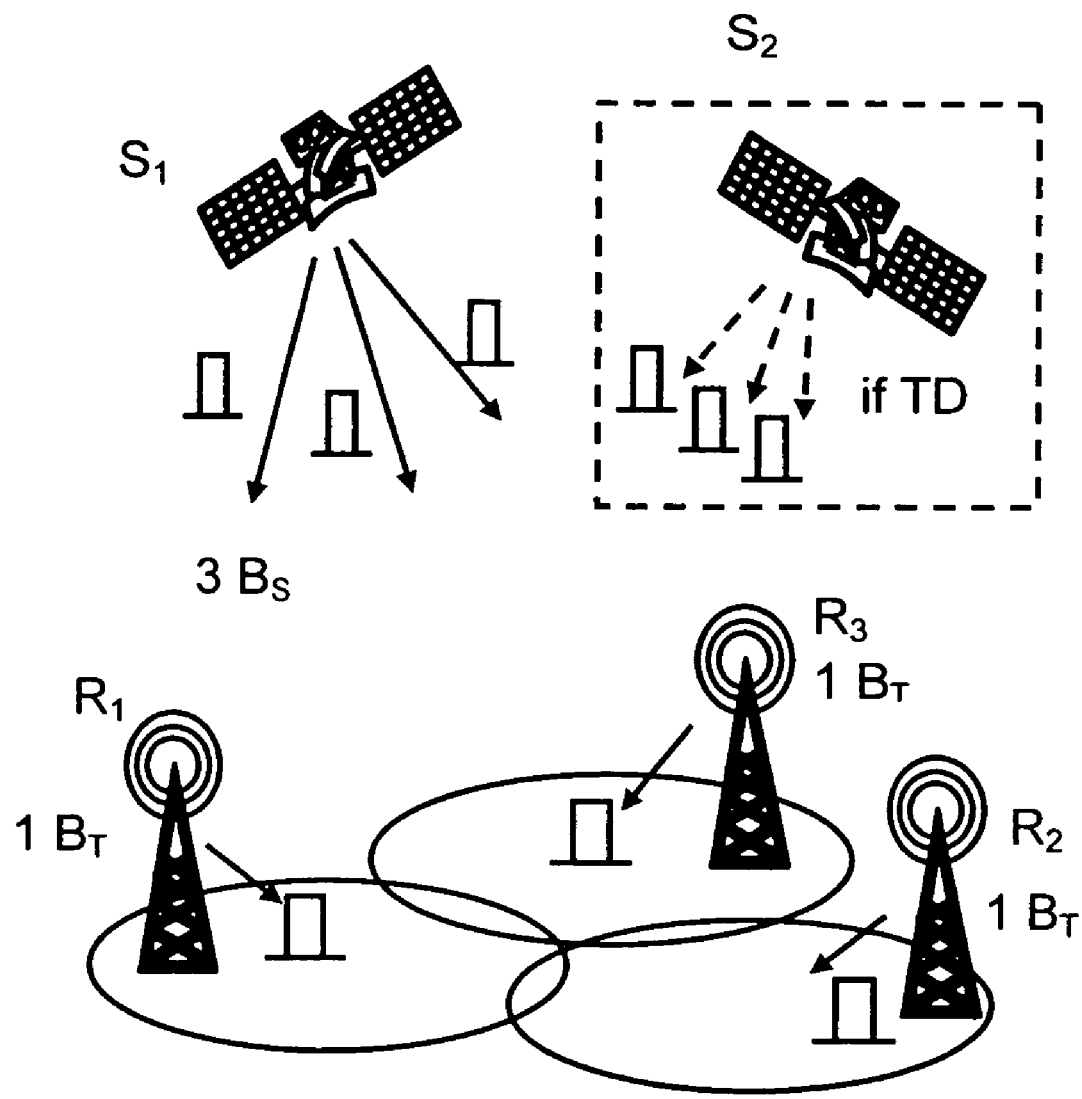
FIG. 2a is a schematic representation of a satellite system broadcasting in multi-beam arrangement according an embodiment of the solution proposed by the present invention.

As shown in FIG. 2a, a satellite system is used operating in the multibeam configuration wherein the satellite S1 transmits a respective beam to each terrestrial repeater R1, R2 and R3. Each beam transmitted occupies a bandwidth of $B_S$ in analogy to example of FIGS. 1a and 1b. The terrestrial repeaters R1, R2 and R3 are capable of receiving, processing and re-transmitting said respective beams.

In the example of FIG. 2a, three repeaters are depicted which in turn would require three TDM bit streams of the downlink beam broadcast from the satellite, namely $3B_S$. Nevertheless, the invention is not to be construed as being limited to only three bandwidths as a person skilled in the art would appreciate that the invention as disclosed herein is also applicable to systems with a higher number of repeaters involving more than three bandwidths available in the overall system.

Furthermore, it is to be noted that for the purpose of the present invention, although denominated equally as $B_S$, each one of these bandwidths have different frequency ranges and thus at the repeater side they are clearly distinguishable.

Referring back to the example of FIG. 2a, each repeater R1, R2 and R3 would re-transmit in a respective bandwidth which in analogy to the example of FIG. 1 for TDM mode transmission is assumed to occupy a bandwidth of $B_T = k \times B_S$; where $1 \leq k \leq 2$.

As each repeater would require a bandwidth $B_T$ having a maximum value of $2 B_S$ and as there are at least 3 bandwidths $B_S$ available from which one is used for broadcasting from the satellite, each of said repeaters could be allowed to use the other two bandwidths for its re-transmission needs.

Referring now to FIG. 2b, it can be observed that the total satellite bandwidth used for three TDM downlink transmission—in case of not using time diversity—is $3B_S$, and that each terrestrial repeater can thus use two of the three available beams with the condition that it always uses a frequency bandwidth which is different from the one used for the downlink broadcast from the satellite thereto.

Figure 3:
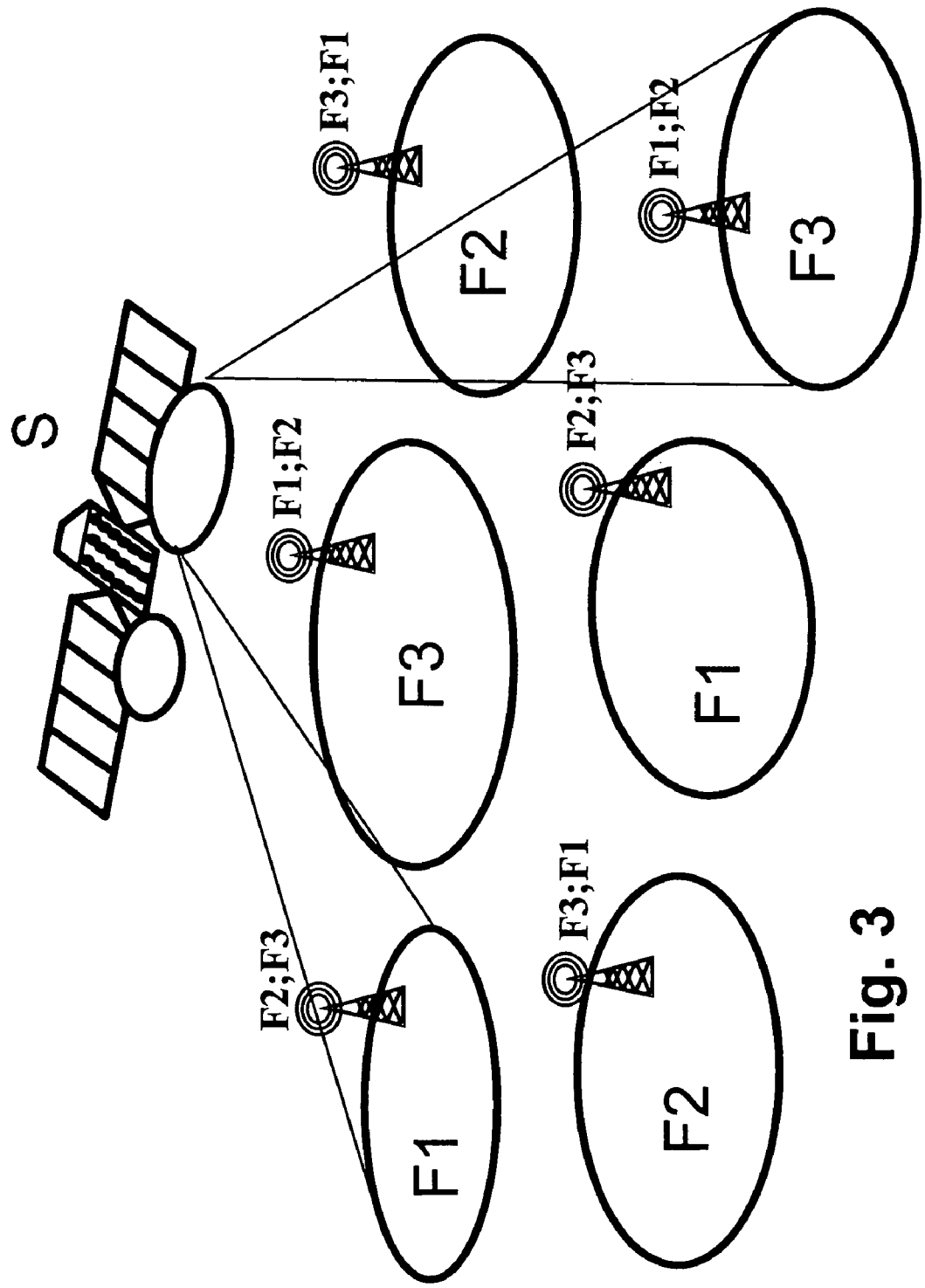
FIG. 3 is a schematic representation of a satellite system broadcasting in multi-beam arrangement according the a specific embodiment of the present invention wherein the concept of re-usage of the frequency bandwidths is shown for three frequency bandwidths.

For the purpose of better understanding, a hypothetical configuration of this situation is illustrated in FIG. 3 wherein the satellite S is assumed to broadcast three beams in the frequency ranges F1, F2, F3 in order to provide coverage on six geographical areas under broadcast. Each area of coverage is also equipped with a repeater. As it may be observed in said figure, the repeater corresponding to each area uses the frequency bandwidths corresponding to two other areas of coverage. Therefore, the repeater located in the area which receives the satellite downlink beam under the frequency bandwidth F1 is made to use the frequency bandwidths F2 and F3 in order to re-transmit the signal to the end users within said geographical area. Likewise, the repeaters in coverage areas under frequency bandwidths F2 and F3 use the frequency bandwidth sets F1;F3, and F2;F1 respectively. The following table summarizes the above description for a better understanding thereof.

|  | Beam 1 | Beam 2 | Beam 3 |
|---|---|---|---|
| Satellite Frequency | F1 | F2 | F3 |
| Terrestrial Repeater Frequency | F2;F3 | F1;F3 | F1;F2 |

In this manner, the total frequency bandwidth used by the system as a whole is only $3B_S$. A similar situation in the case of traditional systems, as discussed further above, but this time in relation to three TDM downlink bit streams and their respective re-transmission by repeater would require $3\times(B_S+B_T)$. As $B_T=k\times B_S$, then the total bandwidth required in the traditional satellite system would be $3\times B_S\times(1+k)$.

Therefore it is shown that by applying the solution proposed by the present invention a reduction factor of $(1+k)$ is achieved. Having in mind that k may vary from 1 to 2, then the reduction factor may represent values between 2 and 3.

In case time diversity is used, and referring to FIGS. 1a, 1b, 2a and 2b, the situation would be as follow:

In a traditional satellite broadcasting system as shown in FIGS. 1a and 1b, three TDM bit streams in a downlink broadcast from two satellites and their respective terrestrial re-transmissions would require $3\times(2B_S+B_T)$ of bandwidth occupation.

This same broadcasting capacity, i.e. 3 TDMs, in the case of applying the solution of the present invention would require only $2\times 3\times B_S$.

It is therefore readily appreciated that the bandwidth reduction thus achieved is by a factor of $(1+k/2)$, namely 1.5 to 2.

It is to be noted that the procedure of reception of the satellite downlink beam by the terrestrial repeaters and their respective processing and re-transmitting of the signals is carried out using means and equipment known generally in the related art.

A typical repeater of this kind makes use, inter alia, of an input RF stage comprising appropriate filtering and amplifying blocks, a baseband stage comprising means for modulation and an output stage comprising a frequency mixer and means for amplifying and filtering the signal which is then passed to an antenna for terrestrial transmission to the end users.

The bandwidth selection is made at the filtering stage. A typical bandwidth selection means could be passband SAW filter although any other means known in the related art may also be used.

It is to be noted that all these steps are known in the art and thus further description thereof does not seem to be necessary for the understanding of the solution proposed by the present invention.

The present invention provides the advantage of providing substantial savings in bandwidth usage and thus increasing system capacity.

The following example illustrates the above advantage in terms of programming versus capacity:

In the relationship $B_T=k\ B_S$, a typical value for k could be 1.5, where k as discussed further above, corresponds to the difference between a satellite channel coding rate of for example ¾ as compared to a terrestrial channel coding rate of for example ½.

In a traditional satellite broadcasting system usually the following frequency blocks are used for transmission: $2B_S$ for carrying the "utile" content, $2B_S$ for time diversity and $2B_T$ for terrestrial repetition. As $2B_T=3B_S$, then the total frequency blocks used for such transmission would be $7B_S$. However, the useful throughput is only $2B_S$ which contains the "utile" content carrying e.g. multimedia programs.

A typical capacity for a TDM bit stream in each $B_S$ block is 60 programs in accordance with the current practice in source coding. Therefore, for $2B_S$ the total capacity is 120 programs.

Now if the solution provided by the present invention is applied for three beams being broadcast, a total of $6B_S$ will be used from which $3B_S$ is used for carrying "utile" content, e.g. multimedia programs and $3B_S$ for time diversity. As each $B_S$ has a useful capacity for 60 programs, then it is readily appreciated that 180 programs in total may be broadcast, thus increasing the capacity of the overall system while, as mentioned before, less frequency blocks have been used, namely 6 according to the invention instead of 7 according to the traditional systems.

It is also to be noted that as in the example given above it is assumed that the terrestrial repeater would require a frequency range of $B_T=1.5B_S$, and it has available $2B_S$ for re-transmission—these being bandwidths corresponding the frequency ranges different from the one received from the satellite—then $0.5B_S$ is available without being used for terrestrial repetition of the satellite beam. This excess bandwidth could then be freely used for any other purposes according to the very needs on the usage of the system resources.

Another advantage of the present invention is that the multi-beam approach enables the supplier to provide services to population with diversity in their profiles; for example more efficient services may be provided to multi-linguistic areas with a reduced use of the resources of the system.

The invention claimed is:

1. A hybrid multispot satellite broadcasting system comprising at least one satellite capable of multibeam broadcasting of beams in respective frequency bandwidths, each one of said beams adapted to be broadcast towards a terrestrial repeater which is capable of receiving, processing and re-transmitting said beam in a frequency bandwidth $B_T$ which is different from that of the bandwidth $B_S$ of the beam received, characterized in that a bandwidth of a signal re-transmitted from a first terrestrial repeater contains a frequency range substantially equal to a bandwidth used for a beam broadcast from said satellite to at least a second terrestrial repeater corresponding to a different area of coverage from said first terrestrial repeater, wherein $B_T=k\times B_S$ and $1\leq k\leq 2$ for time division multiplexing (TDM) mode transmission, and wherein k corresponds to a difference between a satellite channel coding rate and a terrestrial channel coding rate, and wherein k=1 for CDM mode transmission.

2. A satellite system, according to claim 1, wherein said frequency range within the bandwidth of said retransmitted signal contains at least two bandwidths, one being different from the other, said bandwidths being substantially equal to bandwidths used for respective beams broadcast from said satellite to at least a respective second and a respective third terrestrial repeaters.

3. A satellite system according to claim 1, wherein said satellite broadcasts at least a first, a second and a third beam, each beam directed to a respective first, second and third terrestrial repeater, wherein, said first terrestrial repeater re-transmits said first beam using a bandwidth which is a combination of the respective bandwidths of said second and said third beams.

4. The system of claim 1, wherein said signal re-transmitted from said first terrestrial repeater is retransmitted to said second terrestrial repeater.

5. The system of claim 1, wherein k=1.5.

6. The system of claim 1, wherein said satellite channel coding rate is ¾ and said terrestrial channel coding rate is ½.

7. The system of claim 1, wherein said terrestrial repeater requires a frequency range of $B_T=1.5B_S$ and has $2B_S$ available for retransmission, such that $0.5B_S$ is available and not used for said retransmission.

8. A method for a hybrid multispot broadcasting through a satellite system, said system comprising at least one satellite for multibeam broadcasting of beams in respective frequency bandwidths, each one of said beams being broadcast towards a terrestrial repeater which is capable of receiving, processing and re-transmitting said beam in a frequency bandwidth $B_T$ which is different from that of the bandwidth $B_S$ of the beam received, characterized in that said first terrestrial repeater re-transmits said signal in a bandwidth containing a frequency range substantially equal to a bandwidth used for a beam broadcast from said satellite to at least a second terrestrial repeater corresponding to a different area of coverage from said first terrestrial repeater, wherein $B_T=k\times B_S$ and $1\leq k\leq 2$ for time division multiplexing (TDM) mode transmission, and wherein k corresponds to a difference between a satellite channel coding rate and a terrestrial channel coding rate, and wherein k=1 for CDM mode transmission.

9. Method of claim 8 wherein said frequency range within the bandwidth of said retransmitted signal contains at least two bandwidths, one being different from the other, said bandwidths being substantially equal to bandwidths used for respective beams broadcast from said satellite to at least a respective second and a respective third terrestrial repeaters.

10. Method, according to any one of claim 8, wherein said satellite broadcasts at least a first, a second and a third beam, each beam directed to a respective first, second and third terrestrial repeater, wherein, said first terrestrial repeater re-transmits said first beam using a bandwidth which is a combination of the respective bandwidths of said second and said third beams.

11. The method of claim 8, wherein said signal re-transmitted from said first terrestrial repeater is retransmitted to said second terrestrial repeater.

12. The method of claim 8, wherein k=1.5.

13. The method of claim 8, wherein said satellite channel coding rate is ¾ and said terrestrial channel coding rate is ½.

14. The method of claim 8, wherein said terrestrial repeater requires a frequency range of $B_T=1.5B_S$ and has $2B_S$ available for retransmission, such that $0.5B_S$ is available and not used for said retransmission.

\* \* \* \* \*